Feb. 8, 1966 H. REINSCH 3,233,839
FILM THREADER APPARATUS
Filed Dec. 6, 1963 2 Sheets-Sheet 1

INVENTOR
Herbert Reinsch
by
Michael J. Striker

Feb. 8, 1966    H. REINSCH    3,233,839
FILM THREADER APPARATUS
Filed Dec. 6, 1963    2 Sheets-Sheet 2

INVENTOR
Herbert Reinsch
by Michael J. Striker

United States Patent Office 3,233,839
Patented Feb. 8, 1966

3,233,839
FILM THREADER APPARATUS
Herbert Reinsch, Stuttgart, Germany, assignor to
Eugen Bauer G.m.b.H., Stuttgart, Germany
Filed Dec. 6, 1963, Ser. No. 328,683
Claims priority, application Germany, Dec. 8, 1962,
B 69,910
9 Claims. (Cl. 242—55.11)

The present invention relates to photographic apparatus and in particular to motion picture apparatus such as a motion picture camera or a motion picture projector.

In this art there are known devices for automatically threading the film so that it will be guided to the take-up spool, and furthermore these devices are also capable of automatically attaching the film to the take-up spool. While the take-up spool is conventionally driven through a slip clutch, a projection of the film threading structure which guides the film to the take-up spool is located in a slot of the core of the take-up spool to hold the latter stationary with its slot properly positioned to receive the film from the film-guiding passage, and the film-guiding structure includes next to the take-up spool a unit which automatically turns away from the take-up spool after the film is attached thereto and as the film is wound onto the take-up spool. The known devices include one or two projections which cooperate with the slot of the core of the take-up spool to hold the latter stationary until the film is attached thereto, and such projections are somewhat wider than and bridge the film perforations without contacting the exposed film frames so that the film can slide freely with respect to the projections while the film is wound onto the take-up spool.

Structures of the above type, however, require the take-up spool to have at its core a straight slot extending longitudinally along the core parallel to the axis of the spool. However, when different types of take-up spools are used, these known devices cannot cooperate properly therewith. Thus, one very widely used type of take-up spool has at its core a slot part of which is relatively wide and extends through one end of the slot up to about the middle thereof while the remainder of the slot is relatively narrow and of a wavy configuration and extends from the wider part of the slot. The above-described known take-up spool since the narrow wavy part of the slot does not permit the relatively wide projections to enter into the permit the relatively wide projections to enter into the slot. On the other hand, if it is proposed to modify the above-described structure by making the projections so small that they can enter into the narrow wavy part of the slot, the result is that after the film starts to become wound onto the take-up spool these small projections will extend into the film perforations and will damage the film.

A primary object of the present invention, therefore, is to provide a film threading structure capable of attaching the film and guiding it to a take-up spool of the above type which has a slot, part of which is of a narrow wavy configuration without, however, making it possible for the projections to damage the film by entering into the perforations thereof so that the structure of the invention can indeed be used with the take-up spools which have a slot part of which is relatively wide and a part of which is of a narrow wavy configuration.

Another object of the present invention is to provide a structure of this type which makes it easy whenever desired to remove and replace a take-up spool.

Also, it is an object of the invention to provide a structure of the above type which guarantees free movement of the film onto the take-up spool without any possibility of damage of the film due to frictional rubbing thereof with respect to the film threading structure.

Also, it is an object of the present invention to provide a structure of the above type which is exceedingly simple and reliable in operation.

With these objects in view the invention includes, in a motion picture apparatus, a support means for supporting a rotary take-up spool which has at its core a transverse slot part of which is relatively wide and part of which is relatively narrow and of a wavy configuration. A film-guiding means is carried by the support means for automatically guiding film to the core of the take-up spool, and this film-guiding means includes in the region of the take-up spool a unit which is pivotally carried by the support means, which has a pair of spaced walls between which the film is guided to the take-up spool, and which has at a free end of one of these walls a pair of projections one of which is wider and longer than the other with this other projection being small enough to enter into a curved part of the wavy part of the slot to maintain the take-up spool stationary and in a position where the film will automatically move into the slot to become automatically attached to the take-up spool while turning the unit away from the core thereof so that the winding of the film on the take-up spool can then proceed. Upon turning of this unit away from the core, the wider, longer projection engages the film while extending across and beyond perforations thereof so that the film can slide freely with respect to this wider, longer projection which at the same time serves to maintain the smaller projection out of engagement with the film.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
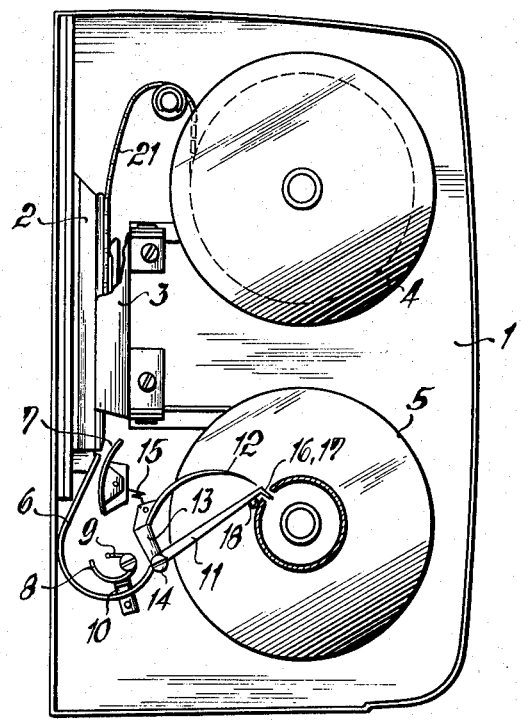
FIG. 1 is a schematic side elevation of a camera provided with the structure of the invention.

Referring to FIG. 1 there is diagrammatically illustrated therein a camera housing 1 provided with a film gate 2 as well as a pressure-plate assembly 3 which in a well known manner maintains the film in the focal plane while it is exposed through the film gate, the film being advanced in a well known manner by an unillustrated claw assembly. These parts of the structure, namely, the film gate 2, the pressure-plate assembly 3 and the film-advancing structure form no part of the present invention and are well known and therefore not shown or described in greater detail.

The camera housing 1 forms in its interior a support means for supporting not only the film gate 2 and pressure-plate assembly 3 but also the supply spool 4 and a take-up spool 5, these spools being supported in a well known manner for rotary movement, and, of course, a suitable drive is connected to the take-up spool to turn the latter through a slip clutch, as is well known. Also, the spools are supported for rotary movement by the support means in a manner well known in the art and not forming part of the present invention.

Ater the film moves beyond the film gate it is automatically guided to the take-up spool by a film-guiding means which is carried by the support means formed by the camera housing 1, and this film-guiding means includes the stationary curved walls 6 and 7 which define between themselves a passage for the film which moves beyond the film guide. The film-guiding means also includes a curved wall 8 cooperating with a curved part of the wall 6 located beyond the wall 7 to continue the guiding of the film which moves beyond the wall 7, and this guide wall 8 is acted upon by spring 9 which urges the wall 8 against a stationary stop 10, the wall 8 being supported at one end for turning movement and being urged by the spring 9 in a counterclockwise direction, as viewed in FIG. 1, into engagement with the stop 10. Thus, the curved wall 8 while guiding the film can yield during "breathing" of the film loops between the film guide and the take-up spool, as is well known in the art.

All the above-described structure is well known and does not form part of the present invention. The structure of the present invention forms a unit of the film-guiding means which is situated between the stationary wall 6 and the take-up spool 5, this unit being supported for pivotal movement by a pivot pin 14 of the support means, this pivot pin 14 being situated at the end of the stationary film-guiding wall 6, as shown in FIG. 1. The unit of the invention, which is shown most clearly in FIGS. 2 and 4, includes a lower wall 11 and an upper wall 12 cooperating with the lower wall to define an elongated passage which forms a continuation of the film passage provided by the walls 6-8 so that the film moving beyond the walls 6 and 8 will enter into the space between the elongated walls 11 and 12. The unit includes a pair of side walls 13 fixed to the upper wall 12 and extending across and fixed to side edge portions of the wall 11 so that in this way the side walls 13 form a means for fixing the elongated walls 11 and 12 to each other while maintaining them in spaced relation, and beyond the wall 11 the side walls 13 have a pair of free end portions, respectively, which form a means for mounting the unit on the support means for turning movement, this latter means being formed by openings in the free end portions of the side walls 13 which receive the pivot pin 14 so that in this way the unit 11-13 is carried by the support means for turning movement. The unit also includes a means which forms a free end portion of the lower wall 11 and which is provided with the projections 16 and 17 which cooperate with the spool 5 and the film in a manner described below. A spring means 15 is operatively connected to the unit 11-13 to urge the latter to turn in a clockwise direction when the unit is in the position of FIG. 1, and this spring means 15 is in the form of an over-center spring which after the unit 11-13 is turned through a given angle in a counterclockwise direction, as viewed in FIG. 1, will continue to urge the unit in a counterclockwise direction to maintain it away from the take-up spool 5 so as to provide for easy and convenient removal and replacement of the take-up spool. Such over-center springs are well known.

Figure 2:
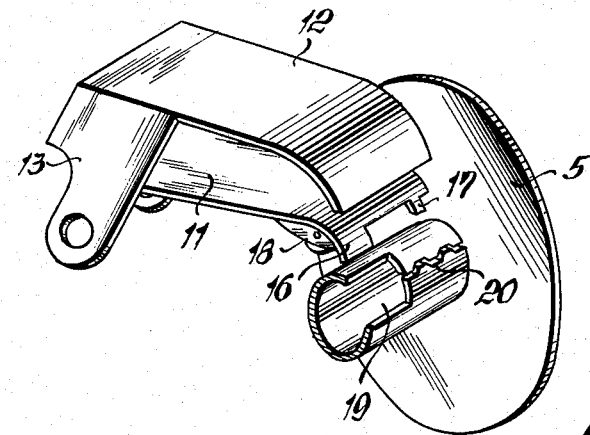
FIG. 2 is a fragmentary perspective view showing the unit of the invention operatively positioned with respect to a take-up spool.
Figure 4:
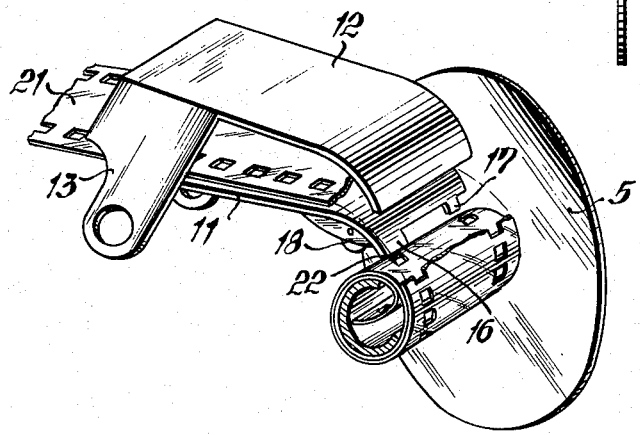
FIG. 4 is a fragmentary perspective illustration showing how the structure operates after the film has already started to wind onto the take-up spool.

As may be seen from FIGS. 2 and 4, the projection 16 at the free end of the lower wall 11 is both wider and longer than the other projection 17, and these projections are spaced from each other by a distance which is approximately equal to the distance between the two rows of film perforations shown in FIG. 4. It will be noted that the free end of the lower wall 11 is curved toward the core of the take-up spool 5 while the free end of the upper wall 12 is also curved to define with the free end of the lower wall 11 an outlet through which the film will move toward the core of the take-up spool. The wall 11 also carries at its underside and adjacent to its free end an anti-friction means 18 in the form of a ball member which is freely rotatable in a suitable socket.

Figure 3:
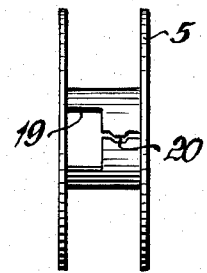
FIG. 3 is an end elevation of a take-up spool illustrating the configuration of the slot thereof.

As may be seen from FIG. 3, the core of the take-up spool has a transverse slot provided with a relatively wide portion 19 and a relatively narrow wavy portion 20 extending from the wide portion 19.

The above-described structure operates as follows:

The film 21 which moves beyond the supply spool 4 is guided between the film gate 2 and the pressure-plate assembly 3 and as soon as it is engaged by the claw assembly the film will be automatically advanced in a stepwise manner into the film-guiding means 6-8 so as to reach the unit 13 in a fully automatic manner. In the meantime, the spool 5 has started to turn and initially the wider, longer projection 16 will slidably engage the exterior surface of the core of the spool 5. However, after the spool 5 has turned so as to bring the slot 19, 20 up to the free end of the wall 11, the projection 16 will enter into the wider slot part 19 while the projection will first engage the exterior surface of the core and will then, because of its small size, enter into a curved portion of the wavy slot part 20, and when the small projection 17 enters into the slot 20 the turning of the spool 5 will be arrested and the drive will simply slip at the slip clutch. Thus, the film will be automatically advanced beyond the end of the guide walls 6 and 8 into the passage between the walls 11 and 12 to the outlet formed by the free ends thereof and so to the slot. Because the slot is maintained by the projection 17 in a position aligned with the outlet formed by the walls 11 and 12 the free end of the film will be directed into and through the slot 19, 20 and as the film continues to advance it will raise the unit 11-13 in opposition to the spring 15 in a counterclockwise direction, as viewed in FIG. 1, so that the projection 17 will move out of the slot and release the film spool 5 for turning movement in a clockwise direction, as viewed in FIG. 1, with the film attached thereto so that the film will automatically wind onto the take-up spool, and as the film continues to wind onto the take-up spool it is engaged by the wider, longer projection 16 which bridges and extends slightly beyond the perforations 22 so that the film can slide freely with respect to the projection 16 without being damaged thereby. This projection 16, of course, does not extend up to the exposed film frames on the film strip. Because the projection 17 is shorter than the projection 16, when the latter engages the film strip the projection 17 is necessarily maintained out of engagement with the film strip so that even though this smaller projection 17 is aligned with the other row of perforations it cannot enter into these perforations and thus the film cannot be damaged by the projection 17. Thus, as the film moves through the film guides 6-8 it is necessarily curved and when entering into the passage formed between the walls 11 and 12 it will be curved further so as to be directed into the slot 19, 20, and because the film continues to be advanced toward the spool 5 it bulges upwardly between the walls 11 and 12 engaging the upper wall 12 and turning the unit 11-13 in opposition to the spring 15 in a counterclockwise direction, as viewed in FIG. 1, so that the projection 17 is raised out of the slot part 20, as described above, thus releasing the spool 5 which starts to turn and wind the film thereon as described above.

As the film continues to wind onto the take-up spool the outermost convolution of the film approaches the anti-friction roller 18 which then engages the film and during the remainder of the winding of the film onto the take-up spool the projection 16 also is maintained out of engagement with the film, and the freely turnable roller 18, of course, prevents any possible damage to the film. The size and arrangement of the roller 18 and projection 16 is such that the projection 16 will be raised away from the film which will only be engaged by the roller 18 by the time the leader of film has been wound onto the take-up spool.

While the structure has been described above in connection with a camera, it is, of course, apparent that the invention is equally applicable to a motion picture projector.

It will be understood that each of the elements described above, or two or more together, may also find a useful application in other types of motion picture apparatus differing from the types described above.

While the invention has been illustrated and described as embodied in film threading structure for motion picture apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a motion picture apparatus, in combination, support means for supporting a rotary take-up spool which is formed in its core with a transverse slot which has a relatively wide portion and a narrow wavy portion extending from said wide portion; film-guiding means carried by said support means for guiding film through a film gate to the take-up spool, said film-guiding means including next to the take-up spool a unit pivotally carried by said support means and having a free end located next to the core of the take-up spool between the flanges thereof when the take-up spool is empty; spring means operatively connected to said unit for urging the latter to turn in a direction which maintains the free end thereof at said core and at the outermost convolution of film wound onto said take-up spool, said unit including a pair of spaced walls between which the film is guided toward the take-up spool and one of said walls terminating at said free end of said unit in a pair of projections one of which is wider and longer than the other, said wider and longer projection being wider than a film perforation to extend across and beyond the film perforations at one side of a film strip while maintaining the shorter projection out of engagement with the film strip and said shorter projection entering into a curved portion of the wavy part of the slot of the core of the take-up spool when the latter is empty for holding the spool stationary until film is advanced through the core slot into the core to be automatically attached to the take-up spool, the continued advance of the film turning said unit in opposition to said spring means away from said core to raise said smaller projection out of said slot and release said take-up spool for turning movement to wind the film thereon, said wider projection extending into the wider part of the slot when the take-up spool is held stationary by the location of said smaller projection in the wavy part of the slot.

2. In a motion picture apparatus, in combination, support means supporting for rotary movement a take-up spool having a core formed with a transverse slot having at one end a relatively wide portion and having a narrow wavy portion extending from said wide portion; film-guiding and threading means turnably carried by said support means adjacent to said take-up spool, said film-guiding and threading means including a pair of elongated walls connected to each other and forming between themselves a passage for the film, one of said walls being turnably supported by said support means, and said walls respectively having free ends spaced from each other and located adjacent the core of the take-up spool when the latter is empty to form an outlet through which the film is advanced to said core, the free end which is nearest to said core engaging the latter and having a pair of projections one of which is wider and longer than the other and located in the wider part of said slot when the take-up spool is empty while said other projection is received in a curved portion of the wavy part of the slot when the take-up spool is empty to maintain the latter stationary with said slot in a position for receiving film advancing through said outlet to said core, the continued advance of the film raising said free ends away from said core while said wider and longer projection engages the film strip extending across and beyond perforations thereof to provide for free sliding of the film strip relative to said wider, longer projection which when it engages the film strip maintains the smaller projection out of engagement with the film strip; and spring means urging said film-guiding and threading means to turn in a direction which tends to move said projections toward said core.

3. In a motion picture apparatus, in combination, support means supporting for rotary movement a take-up spool having a core formed with a transverse slot having at one end a relatively wide portion and having a narrow wavy portion extending from said wide portion; film-guiding and threading means turnably carried by said support means adjacent to said take-up spool, said film-guiding and threading means including a pair of elongated walls connected to each other and forming between themselves a passage for the film, one of said walls being turnably supported by said support means, and said walls respectively having free ends spaced from each other and located adjacent the core of the take-up spool when the latter is empty to form an outlet through which the film is advanced to said core, the free end which is nearest to said core engaging the latter and having a pair of projections one of which is wider and longer than the other and located in the wider part of said slot when the take-up spool is empty while said other projection is received in a curved portion of the wavy part of the slot when the take-up spool is empty to maintain the latter stationary with said slot in a position for receiving film advancing through said outlet to said core, the continued advance of the film raising said free ends away from said core while said wider and longer projection engages the film strip extending across and beyond perforations thereof to provide for free sliding of the film strip relative to said wider, longer projection which when it engages the film strip maintains the smaller projection out of engagement with the film strip; and spring means urging said film-guiding and threading means to turn in a direction which tends to move said projections toward said core, said spring means being an over-center spring means which, when said film-guiding and threading means is turned through a predetermined angle away from said core, will maintain said film-guiding and threading means away from the take-up spool to facilitate removal and replacing thereof.

4. For use in a motion picture apparatus, in combination, a pair of spaced elongated walls defining between themselves a passage for a film strip; means connecting said walls to each other to maintain them in spaced relationship; means connected to said walls for connecting the latter pivotally to a support of a photographic apparatus; and means forming a free end portion of one of said walls and adapted to engage first the core of a take-up spool and then film wound thereon, said last-mentioned means including at the free end of said one wall a pair of projections one of which is wider and longer than the other for engaging a film strip and extending across and beyond the perforations thereof while maintaining the other projection out of engagement with the film strip so that the film can freely slide with respect to said one projection.

5. For use in a motion picture apparatus, in combination, a pair of spaced elongated walls defining between themselves a passage for a film strip; means connecting said walls to each other to maintain them in spaced relationship; means connected to said walls for connecting the latter pivotally to a support of a photographic apparatus; and means forming a free end portion of one of said walls and adapted to engage first the core of a take-up spool and then film wound thereon, said last-mentioned means including at the free ned of said one wall a pair of projections one of which is wider and longer than the other for engaging a film strip and extending across and beyond the perforations thereof while maintaining the other projection out of engagement with the film strip so that the film can freely slide with respect to said one projection, said other projection being spaced from said one projection by a distance substantially equal to the distance between the rows of perforations along the opposite edge portions of a film strip.

6. For use in a motion picture apparatus, in combination, a pair of spaced elongated walls defining between themselves a passage for a film strip; means connecting said walls to each other to maintain them in spaced relationship; means connected to said walls for connecting the latter pivotally to a support of a photographic apparatus; means forming a free end portion of one of said walls and adapted to engage first the core of a take-up spool and then film wound thereon, said last-mentioned means including at the free end of said one wall a pair of projections one of which is wider and longer than the other for engaging a film strip and extending across and beyond the perforations thereof while maintaining the other projection out of engagement with the film strip so that the film can freely slide with respect to said one projection; and anti-friction means carried by the wall which is provided with said projections at a portion of the wall which is adjacent to said projections and directed toward the core of a take-up spool for engaging film on the latter after a predetermined amount of film has initially been wound onto the take-up spool.

7. A film-guiding and threading unit for photographic apparatus, comprising, in combination, a lower elongated wall having a curved free end which terminates in a pair of projections one of which is wider and longer than the other, an elongated upper wall spaced from and extending in the same general direction as said lower wall and having a free end spaced from the free end of said lower wall, said walls defining between themselves a film passage and said free ends defining an outlet for the film through which the film is adapted to move to the core of a take-up spool which is held stationary by said other projection until film starts to wind onto the take-up spool whereupon the film is engaged over perforations thereof by said one projection which extends across and beyond film perforations; and a pair of side walls fixed to one of said walls extending across side edge portions of and fixed to the other of said walls, for maintaining said walls fixed to each other in spaced relation with respect to each other, and said side walls terminating in a pair of free end portions, respectively, for mounting the walls in a photographic apparatus.

8. A film-guiding and threading unit for photographic apparatus, comprising, in combination, a lower elongated wall having a curved free end which terminates in a pair of projections one of which is wider and longer than the other, an elongated upper wall spaced from and extending in the same general direction as said lower wall and having a free end spaced from the free end of said lower wall, said walls defining between themselves a film passage and said free ends defining an outlet for the film through which the film is adapted to move to the core of a take-up spool which is held stationary by said other projection until film starts to wind onto the take-up spool whereupon the film is engaged over perforations thereof by said one projection which extends across and beyond film perforations; and a pair of side walls fixed to one of said walls extending across side edge portions of and fixed to the other of said walls, for maintaining said walls fixed to each other in spaced relation with respect to each other, and said side walls terminating in a pair of free end portions, respectively, for mounting the walls in a photographic apparatus, said free end portions of said side walls being respectively formed with aligned openings for receiving a pivot pin.

9. A film-guiding and threading unit for photographic apparatus, comprising, in combination, a lower elongated wall having a curved free end which terminates in a pair of projections one of which is wider and longer than the other, an elongated upper wall spaced from and extending in the same general direction as said lower wall and having a free end spaced from the free end of said lower wall, said walls defining between themselves a film passage and said free ends defining an outlet for the film through which the film is adapted to move to the core of a take-up spool which is held stationary by said other projection until film starts to wind onto the take-up spool whereupon the film is engaged over perforations thereof by said one projection which extends across and beyond film perforations; a pair of side walls fixed to one of said walls extending across side edge portions of and fixed to the other of said walls, for maintaining said walls fixed to each other in spaced relation with respect to each other, and said side walls terminating in a pair of free end portions, respectively, for mounting the walls in a photographic apparatus; and spring means operatively connected to one of said walls for urging both walls to turn in a given direction when the walls are mounted in a photographic apparatus.

No references cited.

MERVIN STEIN, *Primary Examiner.*

G. F. MAUTZ, *Assistant Examiner.*